United States Patent
Li et al.

(10) Patent No.: US 10,673,056 B2
(45) Date of Patent: Jun. 2, 2020

(54) SECONDARY BATTERY (71) Applicant: CONTEMPORARY AMPEREX TECHNOLOGY CO., LIMITED, Ningde (CN)

(72) Inventors: Xiang Li, Ningde (CN); Rulai Cai, Ningde (CN); Peng Wang, Ningde (CN); Wei Yang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 102 days.

(21) Appl. No.: 15/669,936

(22) Filed: Aug. 6, 2017

(65) Prior Publication Data
US 2018/0138491 A1 May 17, 2018

(30) Foreign Application Priority Data
Nov. 15, 2016 (CN) .......................... 2016 1 1005221

(51) Int. Cl.
*H01M 2/30* (2006.01)
*H01M 2/34* (2006.01)
(Continued)

(52) U.S. Cl.
CPC .......... *H01M 2/345* (2013.01); *H01M 2/0426* (2013.01); *H01M 2/0473* (2013.01);
(Continued)

(58) Field of Classification Search
CPC ........ H01M 2/345; H01M 2/30; H01M 2/348; H01M 2200/103; H01M 2200/20;
(Continued)

(56) References Cited

U.S. PATENT DOCUMENTS 6,143,440 A  11/2000 Volz et al.
9,941,549 B2 *  4/2018 Byun ................ H01M 10/4257
(Continued)

FOREIGN PATENT DOCUMENTS

CN   102738522 A   10/2012
CN   105374955 A    3/2016
(Continued)

OTHER PUBLICATIONS

Mott (The resistance of liquid metals, 146 Proceedings of the Royal Society A, 1934, pp. 465-472). (Year: 1934).*
(Continued)

*Primary Examiner* — Cynthia K Walls
(74) *Attorney, Agent, or Firm* — Tucker Ellis LLP (57) ABSTRACT

A secondary battery, including an electrode assembly, a positive terminal, a negative terminal, a top cover plate, a conductive plate and a contact plate, wherein the electrode assembly includes a positive electrode plate, a negative electrode plate and a separator provided therebetween, the positive electrode plate is electrically connected with the positive terminal, and the negative electrode plate is electrically connected with the negative terminal, the contact plate is attached to the negative terminal, the top cover plate is insulated from the negative terminal and is electrically connected with the positive terminal, the conductive plate is fixedly connected with the top cover plate, the contact plate is configured to deform under gas pressure to be in contact with the conductive plate when an internal pressure of the secondary battery exceeds a reference pressure.

11 Claims, 5 Drawing Sheets

(51) Int. Cl.
*H01M 2/04* (2006.01)
*H01M 2/06* (2006.01)

(52) U.S. Cl.
CPC ............ *H01M 2/0486* (2013.01); *H01M 2/06* (2013.01); *H01M 2/30* (2013.01); *H01M 2/348* (2013.01); *H01M 2200/103* (2013.01); *H01M 2200/20* (2013.01)

(58) Field of Classification Search
CPC .... H01M 2/0426; H01M 2/0473; H01M 2/06; H01M 2/0486; H01M 2/20; H01M 2/34; H01M 10/04; H01M 10/42
See application file for complete search history.

(56) References Cited

U.S. PATENT DOCUMENTS

| | | | |
|---|---|---|---|
| 2010/0279160 A1 | 11/2010 | Lee et al. | |
| 2012/0251851 A1 | 10/2012 | Kim | |
| 2014/0205863 A1* | 7/2014 | Byun | H01M 10/4257 429/7 |
| 2015/0079430 A1 | 3/2015 | Han et al. | |
| 2015/0295222 A1 | 10/2015 | Kwak | |
| 2016/0043379 A1 | 2/2016 | Byun et al. | |

FOREIGN PATENT DOCUMENTS

| | | |
|---|---|---|
| CN | 105932181 A | 9/2016 |
| EP | 2362466 A1 | 8/2011 |
| EP | 2461393 A1 | 6/2012 |
| EP | 2506334 A1 | 10/2012 |

OTHER PUBLICATIONS

Partial European Search Report from corresponding European Application No. 17185927.5, dated Oct. 23, 2017.
Office Action from corresponding European Patent Application No. 17185927.5, dated Nov. 20, 2019, 6 pages.
Extended European Search Report from corresponding European Patent Application No. 17185927.5, dated Feb. 9, 2018, 14 pages.
First Office Action from corresponding Chinese Patent Application No. 201611005221.3, dated Jul. 20, 2018, 9 pages.

* cited by examiner

SECONDARY BATTERY

CROSS-REFERENCE TO RELATED APPLICATIONS

The present application claims the benefit of priority to Chinese Patent Application No. 201611005221.3, filed on Nov. 15, 2016, the content of which is incorporated herein by reference in its entirety.

TECHNICAL FIELD

The present application relates to the technical field of energy storage devices and, particularly, to a secondary battery.

BACKGROUND

A secondary battery can be repeatedly charged and discharged, which is widely used in small-sized portable electronic devices such as cellphones, notebooks and the like, and is also widely used in vehicles such as hybrid electric vehicles, pure electric vehicles and the like. In a process of fast charging or high-power discharging, the interior of the secondary battery will generate excessive heat, and electrolyte may be decomposed. Generation of the heat and decomposition of the electrolyte increase the internal pressure of the secondary battery, which may lead to fire and explosion of the secondary battery, and thus reduce safety of the secondary battery.

In the related art, the secondary battery is usually provided with a contact plate, the contact plate is attached to a negative terminal, and a top cover plate is electrically connected with a positive terminal. When the internal pressure of the secondary battery exceeds a reference pressure, the contact plate deforms under gas pressure and is in electrical contact with the top cover plate, resulting in an external short-circuit between a positive electrode plate and a negative electrode plate.

In above solutions, the contact plate is attached to the negative terminal, in order to prevent corrosion of the contact plate, a standard electrode potential of the contact plate should be greater than 0.000V (e.g., copper material selected). However, the top cover plate is positively-charged due to its electrical connection with the positive terminal, corrosion is not serious, as a result, materials with more excellent processability and lower cost can be selected (e.g. aluminum, steel). Since the contact plate and the top cover plate adopt different materials, a resistivity of the top cover plate is greater than a resistivity of the contact plate, and the difference therebetween is relatively large, when the contact plate is in electrical contact with the top cover plate, a contact resistance therebetween is very high, so that an area on the top cover plate where the top cover plate is in contact with the contact plate will generate a large amount of heat. In this case, the top cover plate or the contact plate may easily get fused due to rapid increasing of temperature, which cannot maintain the external short-circuit state between the positive electrode plate and the negative electrode plate, and thus reduce safety of the secondary battery.

SUMMARY

Exemplary embodiments of the present application provide a secondary battery, which can reduce heat generation of an area on a top cover plate where the top cover plate is in contact with a contact plate.

The present application provides a secondary battery, including: an electrode assembly, a positive terminal, a negative terminal, a top cover plate, a conductive plate and a contact plate, the electrode assembly includes a positive electrode plate, a negative electrode plate and a separator provided between the positive electrode plate and the negative electrode plate, the positive electrode plate is electrically connected with the positive terminal, and the negative electrode plate is electrically connected with the negative terminal, the contact plate is attached to the negative terminal, the top cover plate is insulated from the negative terminal and is electrically connected with the positive terminal, the conductive plate is connected with the top cover plate, the contact plate is configured to deform to contact the conductive plate when an internal pressure of the secondary battery exceeds a reference pressure, so as to form an electrical connection path passing through the positive electrode plate, the positive terminal, the top cover plate, the conductive plate, the contact plate, the negative terminal and the negative electrode plate, and a resistivity of the conductive plate is greater than or equal to a resistivity of the contact plate, and is less than a resistivity of the top cover plate.

Preferably, a mounting groove is defined at a side surface of the top cover plate facing the electrode assembly, and the conductive plate is embedded into the mounting groove and is fixedly connected with the top cover plate.

Preferably, the top cover plate is provided with a first through-hole, the conductive plate is embedded into the first through-hole, and the conductive plate is fixedly connected with an inner wall of the first through-hole.

Preferably, the top cover plate is provided with a second through-hole, the conductive plate includes a first plate, a second plate and a middle portion connecting the first plate with the second plate, the middle portion is embedded into the second through-hole, and the first plate and/or the second plate is fixedly connected with the top cover plate.

Preferably, the secondary battery further includes a case, the top cover plate covers the case to form a first chamber and a second chamber, wherein the first chamber is configured to package the electrode assembly, and the second chamber is configured to provide deforming space for the contact plate, the first chamber is spaced from the second chamber by the contact plate.

Preferably, the negative terminal includes a terminal body and an extending portion connected with the terminal body, the extending portion is provided with an opening, the contact plate seals the opening, so as to separate the first chamber from the second chamber.

Preferably, the extending portion, the contact plate and the conductive plate are made of copper, and the top cover plate is made of aluminum.

Preferably, the secondary battery further includes a sealing member, the sealing member is arranged between the top cover plate and the extending portion, or between the top cover plate and the contact plate; the sealing member includes a first sealing surface and a second sealing surface, the first sealing surface contacts the top cover plate, and the second sealing surface contacts the extending portion or the contact plate, the first sealing surface and the second sealing surface are arranged opposite to each other along a height direction of the secondary battery.

Preferably, the contact plate includes a deformable portion and a protruding head, the deformable portion is formed as a sheet structure.

the protruding head is connected with the deformable portion and protrudes in a direction toward the top cover plate, an outer edge of the deformable portion is connected with the extending portion, the contact plate is configured to contact the conductive plate via the protruding head when the contact plate deforms.

Preferably, the secondary battery further includes a fusing member, the fusing member is connected in series into the electrical connection path passing through the positive electrode plate, the positive terminal, the top cover plate, the conductive plate, the contact plate, the negative terminal and the negative electrode plate;

a cross-sectional area of the fusing member is smaller than cross-sectional areas of other portions in the electrical connection path;

the fusing member is connected in series between the negative electrode plate and the negative terminal, or, the fusing member is connected in series between the positive electrode plate and the positive terminal.

The technical solutions provided by the present application can achieve beneficial effects as follows:

The present application provides a secondary battery, including a positive terminal, a negative terminal, a top cover plate, a contact plate and a conductive plate, the contact plate is attached to the negative terminal, the top cover plate is electrically connected with the positive terminal and insulated from the negative terminal, and the top cover plate is fixedly connected with the conductive plate, when an internal pressure of the secondary battery exceeds a reference pressure, the contact plate deforms under gas pressure and is in contact with the top cover plate through the conductive plate, since a resistivity of the conductive plate is greater than or equal to a resistivity of the contact plate and is less than a resistivity of the top cover plate, the difference between the resistivity of the conductive plate and the resistivity of the top cover plate is reduced, and when the conductive plate is in electrical contact with the contact plate, heat generation of an area where the conductive plate is in contact with the contact plate is reduced, thereby reducing risk of being fused of the top cover plate and the contact plate, which maintains an external short-circuit state between a positive electrode plate and a negative electrode plate, and thus improve safety of the secondary battery.

It should be understood that both the above general description and the following detailed description are only exemplary and cannot limit the scope of the present application.

REFERENCE SIGNS 11-negative terminal;
111-terminal body;
112-extending portion;
112a-opening;
12-contact plate;
121-protruding head;
122-deformable portion;
13-sealing member;
131-first sealing surface;
132-second sealing surface;
15-negative terminal plate;
16-insulating member;
17-insulating pad for negative electrode;
21-positive terminal;
23-insulating pad for positive electrode;
24-resistance member;
25-positive terminal plate;
31-top cover plate;
31a-mounting groove;
31b-first through-hole;
31c-second through-hole;
311-protruding portion;
312-body portion;
41-conductive plate;
41a-first plate;
41b-second plate;
41c-middle portion.

The drawings herein are incorporated into and constitute a part of the present specification, which show exemplary embodiments in accordance with the present application and explain principles of the present application together with the present description.

DESCRIPTION OF EMBODIMENTS

The present application will be further illustrated with reference to the accompanying drawings and embodiments. The "front", "rear", "left", "right", "upper" and "lower" mentioned in the context is with reference to the placement status of secondary batteries in the accompanying drawings.

As shown in FIGS. 1-8, an exemplary embodiment of the present application provides a secondary battery, including a positive terminal 21 and a negative terminal 11, the positive terminal 21 and the negative terminal 11 can be connected with an external circuit to form a current loop. The secondary battery serves as a power source in the external circuit, and outputs electric power to an external device.

Generally, the secondary battery further includes an electrode assembly, a case (not shown in the figures) and a top cover plate 31. The top cover plate 31 covers the case to form an accommodating chamber, and the electrode assembly is accommodated in the accommodating chamber.

The electrode assembly usually includes a positive electrode plate and a negative electrode plate, the positive electrode plate is electrically connected with the positive terminal 21, and the negative electrode plate is electrically connected with the negative terminal 11, so that the electrode assembly can output electric power to an external device.

Figure 1:
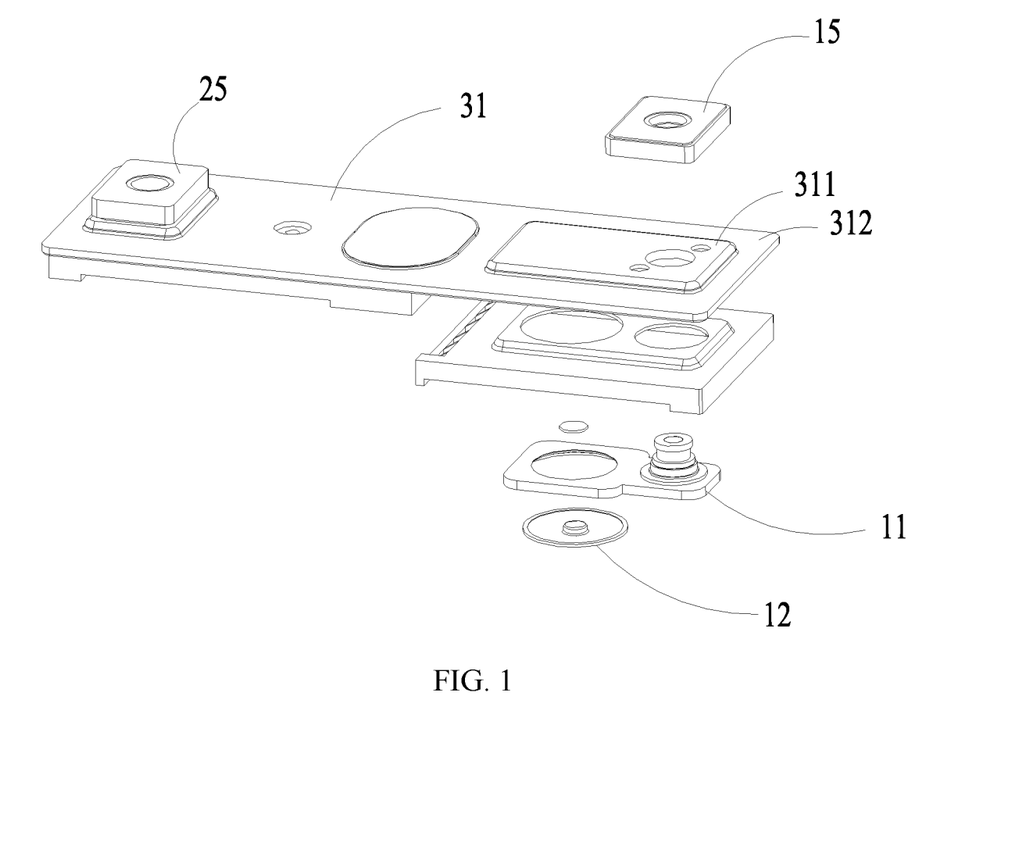
FIG. 1 is an exploded perspective view of a partial structure of a secondary battery provided by an exemplary embodiment of the present application.
Figure 2:
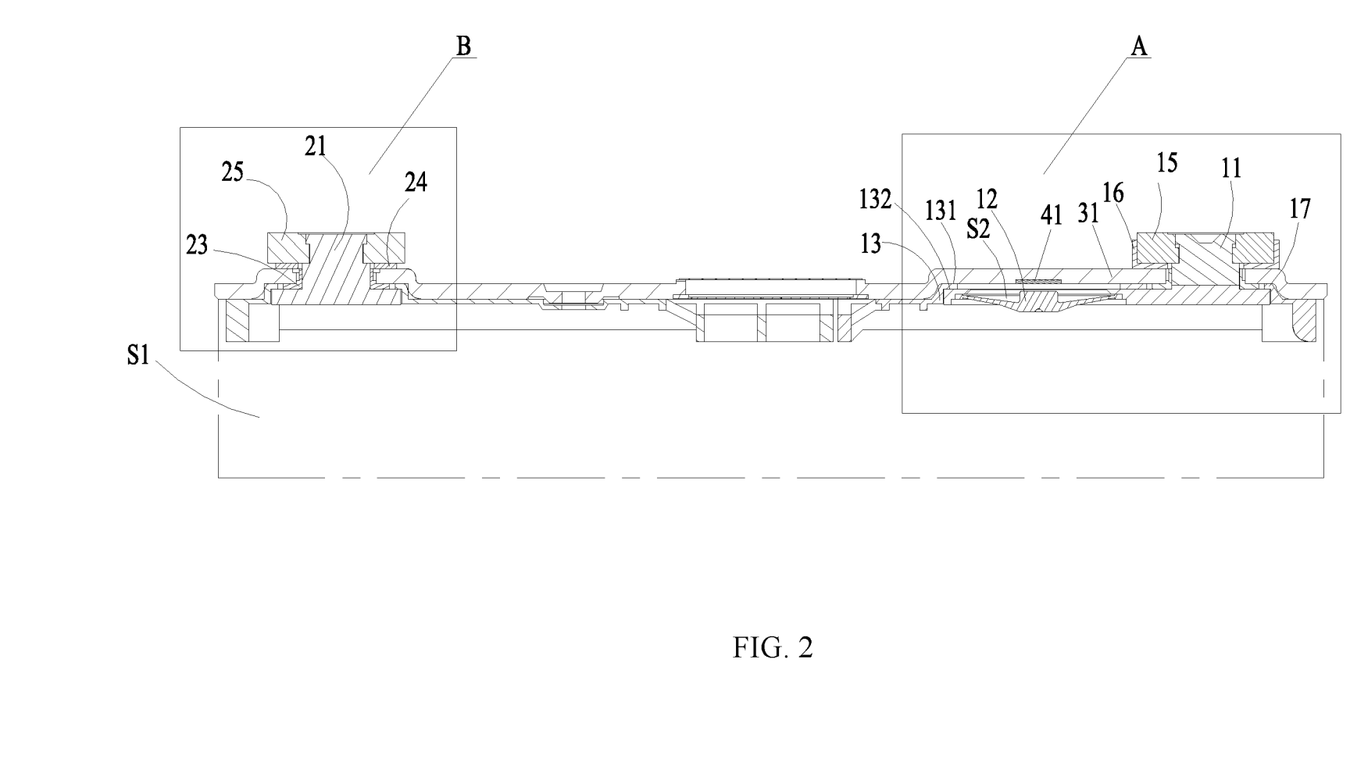
FIG. 2 is a sectional view of a partial structure of a secondary battery provided by an exemplary embodiment of the present application.

As shown in FIGS. 1-2, the secondary battery provided by the present application further includes a contact plate 12 and a conductive plate 41, the contact plate 12 is attached to the negative terminal 11, the top cover plate 31 is insulated from the negative terminal 11 and electrically connected with the positive terminal 21. The contact plate 12 and the negative terminal 11 can be formed as an integrated structure.

The conductive plate 41 is fixedly connected with the top cover plate 31, a resistivity of the conductive plate 41 is greater than or equal to a resistivity of the contact plate 12 and is less than a resistivity of the top cover plate 31.

When an internal pressure of the secondary battery exceeds a reference pressure, the contact plate 12 deforms and is in contact with the conductive plate 41, so as to form an electrical connection path passing through the positive electrode plate, the positive terminal 21, the top cover plate 31, the conductive plate 41, the contact plate 12, the negative terminal 11 and the negative electrode plate.

According to the above descriptions, when the top cover plate 31 is in electrical contact with the contact plate 12 through the conductive plate 41, since the resistivity of the conductive plate 41 is greater than or equal to the resistivity of the contact plate 12 and is less than the resistivity of the top cover plate 31, a difference between the resistivity of the conductive plate 41 and the resistivity of the contact plate 12 is reduced, heat generation of an area on the conductive plate 41 where the conductive plate 41 is in contact with the contact plate 12 is reduced, thereby reducing risk of being fused of the top cover plate 31 and the contact plate 12.

Figure 3:
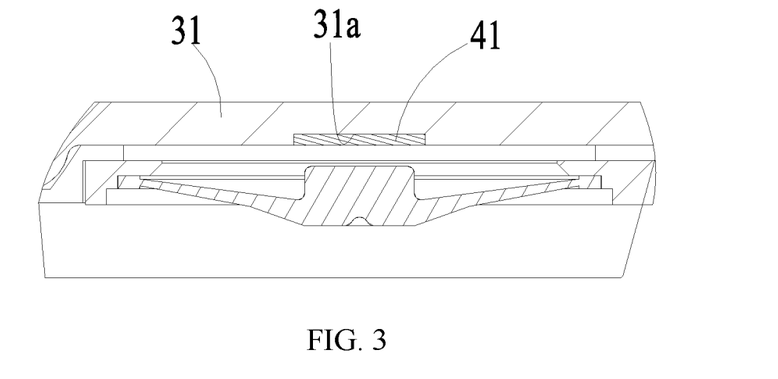
FIG. 3 is a sectional view showing a fixed connection between a conductive plate and a top cover plate provided by a first embodiment of the present application.

The connection manner between the top cover plate 31 and the conductive plate 41 is not unique. According to an exemplary embodiment, as shown in FIG. 3, a mounting groove 31a is provided at a side surface of the top cover plate 31 facing the electrode assembly, and the conductive plate 41 is embedded into the mounting groove 31a and is fixedly connected with the top cover plate 31.

Figure 4:
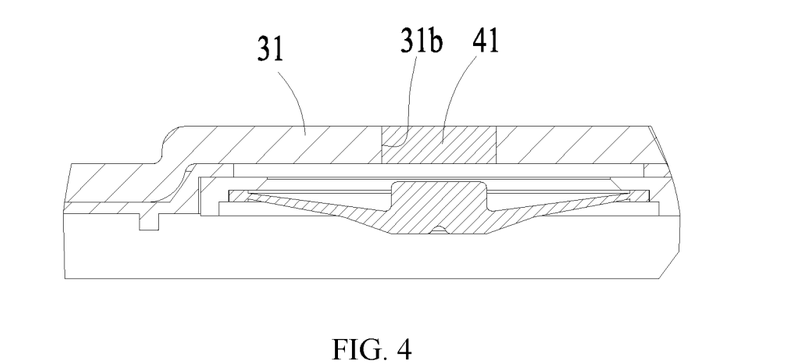
FIG. 4 is a sectional view showing a fixed connection between a conductive plate and a top cover plate provided by a second embodiment of the present application.

According to another exemplary embodiment, as shown in FIG. 4, the top cover plate 31 is provided with a first through-hole 31b, the first through-hole 31b penetrates through the top cover plate 31 along a thickness direction of the top cover plate 31, and the conductive plate 41 is embedded into the first through-hole 31b and is fixedly connected with the top cover plate 31.

Figure 5:
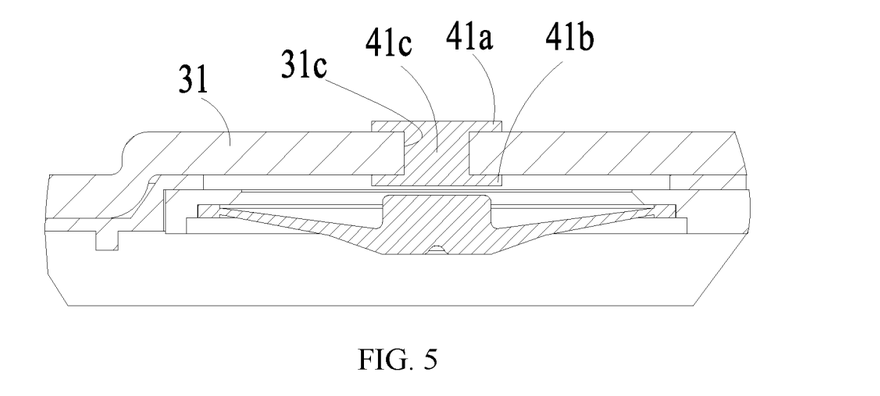
FIG. 5 is a sectional view showing a fixed connection between a conductive plate and a top cover plate provided by a third embodiment of the present application.

According to another exemplary embodiment, as shown in FIG. 5, the top cover plate 31 is provided with a second through-hole 31c, the second through-hole 31c penetrates through the top cover plate 31 along a thickness direction of the top cover plate 31, the conductive plate 41 includes a first plate 41a, a second plate 41b and a middle portion 41c connecting the first plate 41a with the second plate 41b, and the middle portion 41c is embedded into the second through-hole 31c and is fixedly connected with the top cover plate 31 via at least one of the first plate 41a and the second plate 41b.

All the above exemplary embodiments can achieve a fixed connection between the top cover plate 31 and the conductive plate 41, the connection can be made by ultrasonic welding or laser welding, so that the top cover plate 31 is in reliable contact with the contact plate 12 through the conductive plate 41.

In addition, in order to avoid a deficiency of resistance increasing due to the connection between the conductive plate 41 and the top cover plate 31, in the above exemplary embodiments, the specific fixed connection between the conductive plate 41 and the top cover plate 31 can be achieved as follows: the conductive plate 41 includes a first connecting surface, the top cover plate 31 includes a second connecting surface, the first connecting surface is attached to the second connecting surface and is fixedly connected with the second connecting surface at an attaching area. This solution overcomes the deficiency of resistance increasing by enlarging a connection area between the conductive plate 41 and the top cover plate 31, which reduces heat generation of the top cover plate 31.

As shown in FIG. 2, the accommodating chamber formed by the top cover plate 31 covering the case includes a first chamber S1 and a second chamber S2. Specifically, the first chamber S1 is configured to package the electrode assembly, the second chamber S2 is configured to provide deforming space for the contact plate 12, and the first chamber S1 is spaced from the second chamber S2 via the contact plate 12. When an internal pressure of the first chamber S1 exceeds a reference pressure, gas pressure is applied on the contact plate 12 and pushes the contact plate 12 to deform.

Since space of the second chamber S2 formed by the top cover plate 31 covering the case is limited, the deforming space of the contact plate 12 is then limited, in order to expand the space, as shown in FIG. 1, the top cover plate 31 preferably includes a body portion 312 and a protruding portion 311, the protruding portion 311 protrudes in a direction away from the case, so that the second chamber S2 is formed by the contact plate 12 and the protruding portion 311. In this manner, the space of the second chamber S2 gets expanded, and the significance of the space expansion is that, when the contact plate 12 deforms, an air compression ratio in the space is reduced, a resistance force applied on the contact plate 12 is reduced when the contact plate 12 deforms, which facilitates to improve a deforming sensitivity of the contact plate 12.

Figure 6:
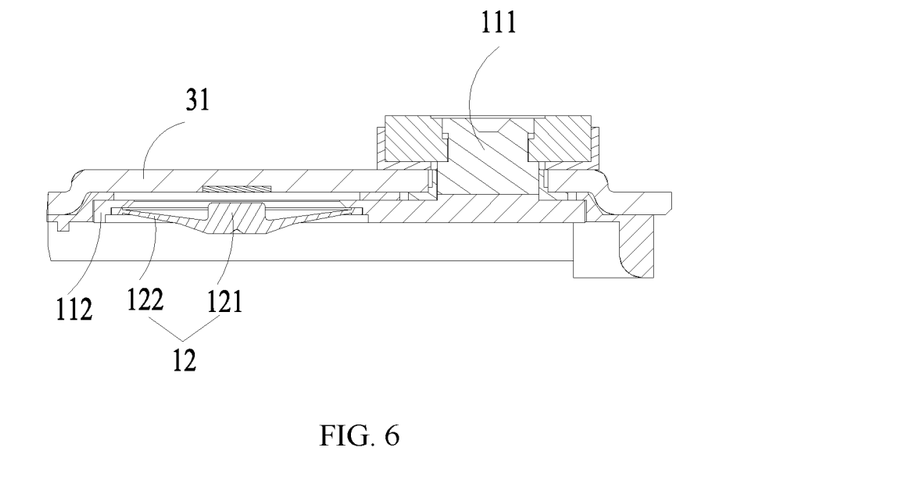
FIG. 6 is an enlarged view of portion A in FIG. 2.

As shown in FIG. 6, according to an exemplary embodiment, the contact plate 12 includes a protruding head 121 and a deformable portion 122, the deformable portion 122 is formed as a sheet structure with a circular surface, which facilitates the contact plate 12 to reliably deform under gas pressure, the protruding head 121 is connected with the deformable portion 122 and protrudes in a direction toward the top cover plate 31, and when the contact plate 12 deforms, the contact plate 12 can be in contact with the conductive plate 41 via the protruding head 121, i.e., the protruding head 121 can contact the conductive plate 41 when the contact plate 12 deforms. In this solution, the arrangement of the protruding head 121 can reduce a deforming extent of the contact plate 12 on the basis of retaining an appropriate interval with the top cover plate 31, which improves safety of the secondary battery. Further, the protruding head 121 and the deformable portion 122 can be formed as an integrated structure.

Figure 7:
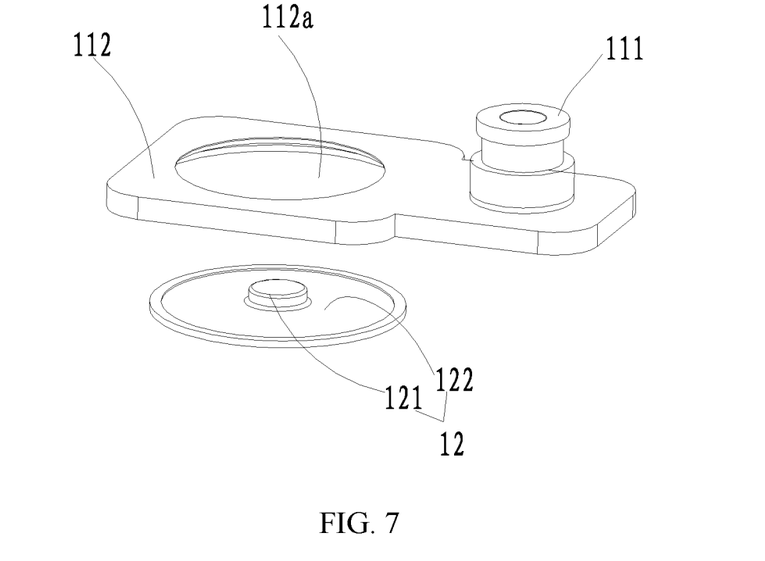
FIG. 7 is an exploded perspective view showing a state in which a negative terminal is connected with a contact plate provided by an exemplary embodiment of the present application.

As shown in FIG. 7, the negative terminal 11 includes a terminal body 111 and an extending portion 112 connected with the terminal body 111, the extending portion 112 extends in a direction toward the positive terminal 21, the extending portion 112 is provided with an opening 112a, an outer edge of the contact plate 12 is sealingly connected on the extending portion 112, and the middle portion of the contact plate 12 is blocked at the opening 112a. In this manner, when the contact plate 12 deforms, the contact plate 12, more specifically the protruding head 121, can be in contact with the conductive plate 41 through the opening 112a. The terminal body 111 is configured to be electrically connected with an external circuit, the extending portion 112 is configured to be connected with the contact plate 12, which facilitates arrangements of the contact plate 12 on the negative terminal 11.

In the above exemplary embodiment, the terminal body 111 and the extending portion 112 are formed as an integrated structure, however, it should be noted that, in other exemplary embodiments, the terminal body 111 and the extending portion 112 can also be separately arranged, which will not be limited in the present application.

In order to further reduce the heat generation on an area of the conductive plate 41 where the conductive plate 41 is in contact with the contact plate 12, the extending portion 112, the contact plate 12 and the conductive plate 41 can be made of copper material, while the top cover plate 31 is made of aluminum material. In this manner, in one aspect, it can reduce corrosion of the case and the top cover plate 31 by electrolyte and extend service life; in another aspect, when the conductive plate 41 and the contact plate 12 are made of the same material, the resistivity of the conductive plate 41 is identical to that of the contact plate 12, which can remarkably avoid a situation that the heat generation on an area of the conductive plate 41 where the conductive plate 41 is in contact with the contact plate 12 increases rapidly, and thus further reduce risk of being fused of the top cover plate 31 and the contact plate 12.

The insulation manner between the top cover plate 31 and the negative terminal 11 can be achieved, for example, by proving an insulating piece between the negative terminal 11 and the top cover plate 31. As shown in FIG. 2, an insulating pad 17 for negative electrode is provided between the negative terminal 11 and the top cover plate 31, and the insulating pad 17 for negative electrode is clamped between the negative terminal 11 and the top cover plate 31, so as to achieve insulation therebetween. The insulating pad 17 for negative electrode can be made of materials such as rubber, asbestos, etc.

Generally, both a portion of the negative terminal 11 and a portion of the positive terminal 21 extend out of the top cover plate 31, and the portions extending out of the top cover plate 31 are connected with the external circuit. In some exemplary embodiments, the positive terminal 21 may not extend out of the top cover plate 31, in this case, the positive terminal 21 can be electrically connected with the external circuit through the top cover plate 31.

In order to guarantee a quick response of the contact plate 12 to the internal pressure of the secondary battery, the secondary battery further includes a sealing member 13 arranged and sealed between the first chamber S1 and the second chamber S2. According to an exemplary embodiment, as shown in FIG. 2, the sealing member 13 is sealingly arranged between the extending portion 112 and the top cover plate 31, and the sealing member 13 includes a first sealing surface 131 in sealing contact with the top cover plate 31 and a second sealing surface 132 in sealing contact with the extending portion 112, the first sealing surface 131 is arranged opposite to the second sealing surface 132 along a height direction of the secondary battery.

In other exemplary embodiments, it is possible that the sealing member 13 can be sealingly arranged between the contact plate 12 and the top cover plate 31, then the contact plate 12 may be varied according to the sealing requirements.

It should be noted that, in the exemplary embodiment shown in FIG. 2, the sealing member 13 can also serve as an insulating piece, so as to ensure that the top cover plate 31 is insulated from the extending portion 112.

In the present application, the secondary battery further includes a resistance member 24, the resistance member 24 is connected in series into the electrical connection path passing through the positive electrode plate, the positive terminal 21, the top cover plate 31, the conductive plate 41, the contact plate 12, the negative terminal 11 and the negative electrode plate. In this solution, at the conducting moment of the electrical connection path, a peak value of the short-circuit current can be controlled due to the presence of the resistance member 24.

Furthermore, although the resistance member 24 plays a role in reducing the peak value of the short-circuit current, however, in practice, it is also possible that the short-circuit current fuses the contact portion between the contact plate 12 and the conductive plate 41, so that the electrode assembly is electrically disconnected from the external circuit, and thus reduce occurrence of fire and explosion and other dangerous accidents of the secondary battery. The resistance value of the resistance member 24 can be selected in a range from 0.1 mΩ to 10 mΩ, for example, the resistance member 24 can be made of materials such as steel, stainless steel or nickel steel alloy, etc.

Figure 8:
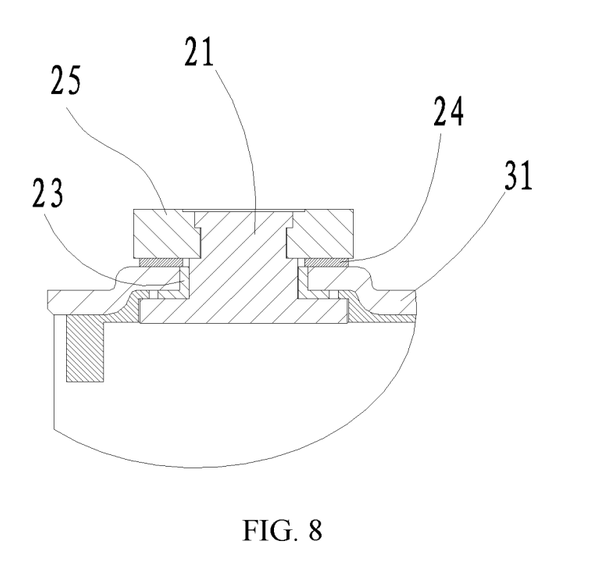
FIG. 8 is an enlarged view of portion B in FIG. 2.

Position of the resistance member 24 can be selected according to practical application environment, as shown in FIG. 8, the resistance member 24 is arranged at the positive terminal 21, the top cover plate 31 is electrically connected with the positive terminal 21 through the resistance member 24. This solution allows the resistance member 24 to be less affected by the heat generated when the contact plate 12 is in contact with the top cover plate 31.

As shown in FIGS. 1-2, the secondary battery further includes a positive terminal plate 25, and the positive terminal plate 25 is electrically connected with the positive terminal 21, in this case, the resistance member 24 can be connected in series between the positive terminal plate 25 and the top cover plate 31, thus, a short-circuit current flows through the top cover plate 31, the resistance member 24, the positive terminal plate 25 and the positive terminal 21, this solution facilitates arrangement of the resistance member 24. It should be noted that, an insulating pad 23 for positive electrode is provided between the positive terminal 21 and the top cover plate 31, one end of the positive terminal 21 away from the top cover plate 31 is electrically connected with the top cover plate 31 through the positive terminal plate 25 and through the resistance member 24, and the other end of the positive terminal 21 close to the top cover plate 31 is insulated from the top cover plate 31 via the insulating pad 23 for positive electrode.

Correspondingly, the secondary battery further includes a negative terminal plate 15, the negative terminal plate 15 is electrically connected with the negative terminal 11, and an insulating member 16 is provided between the negative terminal plate 15 and the top cover plate 31 for insulating the two from each other. It should be noted that, the arrangement of the negative terminal plate 15 and the positive terminal plate 25 can facilitate the connection between the negative terminal 11, the positive terminal 21 and the external circuit, that is, such arrangement is aimed at facilitating installation, but not a necessity.

It should be understood by those skilled in the art that, when the secondary battery is in normal operation, a normal current successively flows through the positive terminal plate 25, the positive terminal 21 and the positive electrode plate, although the resistance member 24 is presented, the output of the secondary battery in normal operation will not be influenced.

The present application further includes a fusing member (not shown in the figures), the fusing member is connected in series into the electrical connection path passing through the positive electrode plate, the positive terminal 21, the top cover plate 31, the conductive plate 41, the contact plate 12, the negative terminal 11 and the negative electrode plate. A cross-sectional area of the fusing member is smaller than that of other portions in the electrical connection path. The fusing member can be connected in series between the negative electrode plate and the negative terminal 11, or the fusing member can also be connected in series between the positive electrode plate and the positive terminal 21, or two fusing members can be provided and one fusing member is connected in series between the negative electrode plate and the negative terminal 11 while the other one is connected in series between the positive electrode plate and the positive terminal 21. The fusing member can be fused when a large short-circuit current passes through the electrical connection path, thereby electrically disconnecting the electrode assembly from the external circuit, which reduces risk of fire and exploration of the secondary battery.

The fusing member can be provided separately or can be integrated with other parts as a whole structure. According to an exemplary embodiment, the secondary battery can further include a connecting piece for positive electrode and a connecting piece for negative electrode, the connecting piece for positive electrode connects the positive electrode plate with the positive terminal, and the connecting piece for negative electrode connects the negative electrode plate with the negative terminal. The fusing member is formed on at least one of the connecting piece for positive electrode and the connecting piece for negative electrode.

When the secondary battery is in normal operation, the connecting piece for positive electrode can serve as an electrical connecting piece electrically connecting the positive electrode plate with the positive terminal 21, and the connecting piece for negative electrode can serve as an electrical connecting piece electrically connecting the negative electrode plate with the negative terminal 11, which improves assembling process of the secondary battery, and avoids deformation of a positive electrode tab and a negative electrode tab during assembling. However, when a short-circuit is formed between the positive electrode plate and the negative electrode plate, the fusing member formed on the connecting piece for positive electrode or on the connecting piece for negative electrode can be fused, so as to cut off the short-circuit formed between the positive electrode plate and the negative electrode plate.

The fusing member can be achieved by proving a notch or a hole on the connecting piece for positive electrode, so that a cross-sectional area on the connecting piece for positive electrode is smaller than cross-sectional areas of other portions, and the position with a smaller cross-sectional area is where the fusing member is located. Similarly, the manner that the fusing member is formed on the connecting piece for negative electrode can adopt the above-mentioned structure of the connecting piece for positive electrode, which will not be repeated herein.

It should be noted that, both the fusing member and the resistance member 24 can be connected in series into the electrical connection path passing through the positive electrode plate, the positive terminal 21, the top cover plate 31, the conductive plate 41, the contact plate 12, the negative terminal 11 and the negative electrode plate. The resistance member 24 can reduce a short-circuit current generated at the moment of the contact plate 12 being in contact with the conductive plate 41, however, the reduced short-circuit current is sufficient to fuse the fusing member so that the electrical connection path is open.

It should be noted that, both the fusing member and the resistance member 24 can be connected in series in an electrical connection path passing through the negative electrode plate, the negative terminal 11, the contact plate 12, the top cover plate 31, the conductive plate 41, the positive terminal 21 and the positive electrode plate. The resistance member 24 can reduce a short-circuit current generated at the moment of the contact plate 12 being in contact with the conductive plate 41, however, the reduced short-circuit current is sufficient to fuse the fusing member so that the electrical connection path is open.

The above description only shows the preferred embodiments of the present application and is not intended to limit the present application. Various modifications and variations may be made by those skilled in the art. However, any modifications, equivalent substitutions, improvements and the like within the spirit and principles of the present application shall be included in the protection scope of the present application.

What is claimed is:

1. A secondary battery, comprising an electrode assembly, a positive terminal, a negative terminal, a top cover plate, a conductive plate and a contact plate, wherein the electrode assembly comprises a positive electrode plate, a negative electrode plate and a separator between the positive electrode plate and the negative electrode plate, the positive electrode plate is electrically connected with the positive terminal, and the negative electrode plate is electrically connected with the negative terminal, the negative terminal comprises a terminal body and an extending portion connected with the terminal body, the contact plate is attached to the negative terminal, the contact plate comprises a deformable portion and a protruding head, the deformable portion is formed as a sheet structure, the protruding head is connected with the deformable portion and protrudes in a direction toward the top cover plate, an outer edge of the deformable portion is connected with the extending portion, the top cover plate is insulated from the negative terminal and is electrically connected with the positive terminal, the conductive plate is electrically connected with the top cover plate, the contact plate is configured to deform to contact the conductive plate via the protruding head when an internal pressure of the secondary battery exceeds a reference pressure, so as to form an electrical connection path passing through the positive electrode plate, the positive terminal, the top cover plate, the conductive plate, the contact plate, the negative terminal and the negative electrode plate, and a resistivity of the conductive plate is greater than or equal to a resistivity of the contact plate, and is less than a resistivity of the top cover plate.

2. The secondary battery according to claim 1, wherein a mounting groove is defined at a side surface of the top cover plate facing toward the electrode assembly, and the conductive plate is embedded into the mounting groove and is fixedly connected with the top cover plate.

3. The secondary battery according to claim 1, wherein the top cover plate is provided with a first through-hole, the conductive plate is embedded into the first through-hole and is fixedly connected with an inner wall of the first through-hole.

4. The secondary battery according to claim 1, wherein the top cover plate is provided with a second through-hole, the conductive plate comprises a first plate, a second plate and a middle portion between the first plate and the second plate, the middle portion is embedded into the second through-hole, and the first plate and/or the second plate is fixedly connected with the top cover plate.

5. The secondary battery according to claim 1, further comprising a case, wherein the top cover plate covers the case to form a first chamber and a second chamber, the first chamber is configured to package the electrode assembly, the second chamber is configured to provide deforming space for the contact plate, and the first chamber is spaced from the second chamber by the contact plate.

6. The secondary battery according to claim 5, wherein the extending portion is provided with an opening, and the contact plate seals the opening, so as to separate the first chamber from the second chamber.

7. The secondary battery according to claim 6, wherein the extending portion, the contact plate and the conductive plate are made of copper, and the top cover plate is made of aluminum.

8. The secondary battery according to claim 6, further comprising a sealing member, wherein the sealing member is arranged between the top cover plate and the extending portion; the sealing member comprises a first sealing surface and a second sealing surface, the first sealing surface is contacted with the top cover plate, and the second sealing surface is contacted with the extending portion or the contact plate, the first sealing surface and the second sealing surface are arranged opposite to each other along a height direction of the secondary battery.

9. The secondary battery according to claim 1, further comprising a fusing member, wherein the fusing member is connected in series into the electrical connection path passing through the positive electrode plate, the positive terminal, the top cover plate, the conductive plate, the contact plate, the negative terminal and the negative electrode plate;

a cross-sectional area of the fusing member is smaller than cross-sectional areas of other portions in the electrical connection path;

the fusing member is connected in series between the positive electrode plate and the positive terminal.

10. The secondary battery according to claim 6, further comprising a sealing member, wherein the sealing member is arranged between the top cover plate and the contact plate; the sealing member comprises a first sealing surface and a second sealing surface, the first sealing surface is contacted with the top cover plate, and the second sealing surface is contacted with the extending portion or the contact plate, the first sealing surface and the second sealing surface are arranged opposite to each other along a height direction of the secondary battery.

11. The secondary battery according to claim 1, further comprising a fusing member, wherein the fusing member is connected in series into the electrical connection path passing through the positive electrode plate, the positive terminal, the top cover plate, the conductive plate, the contact plate, the negative terminal and the negative electrode plate;

a cross-sectional area of the fusing member is smaller than cross-sectional areas of other portions in the electrical connection path;

the fusing member is connected in series between the negative electrode plate and the negative terminal.

* * * * *